(12) United States Patent
Willis et al.

(10) Patent No.: US 12,338,792 B2
(45) Date of Patent: Jun. 24, 2025

(54) METHOD FOR INSTALLING A ROTOR ASSEMBLY

(71) Applicant: Wind Harvest International Inc, Davis, CA (US)

(72) Inventors: Jeffrey Willis, Omaha, NE (US); Antonio Monge, El Puerto de Santa Maria (ES); David Malcolm, Kirkland, WA (US); Olamide Ajala-Inyang, Brentwood, CA (US); Omar Garcia, Amarillo, TX (US); Alin-Ionut Munteanu, Leuven (BE)

(73) Assignee: Wind Harvest Intl ( * ) Notice: Subject to any disclaimer, the term of this patent is extended or adjusted under 35 U.S.C. 154(b) by 0 days.

(21) Appl. No.: 18/677,505

(22) Filed: May 29, 2024

(65) Prior Publication Data
US 2024/0401563 A1 Dec. 5, 2024

Related U.S. Application Data

(62) Division of application No. 18/328,746, filed on Jun. 4, 2023.

(51) Int. Cl.
F03D 3/06 (2006.01)
F03D 3/00 (2006.01)
(Continued)

(52) U.S. Cl.
CPC ............ F03D 3/062 (2013.01); F03D 3/005 (2013.01); F03D 13/20 (2016.05); F03D 13/40 (2016.05);
(Continued)

(58) Field of Classification Search
CPC .......... F03D 3/005; F03D 3/062; F03D 3/064; F03D 3/066; F03D 3/20; F03D 3/2005;
(Continued)

(56) References Cited

U.S. PATENT DOCUMENTS 4,421,458 A * 12/1983 Allan ...................... F03D 3/064
416/119
8,322,989 B2 * 12/2012 Ozkul ...................... F03D 7/06
416/157 R
(Continued)

FOREIGN PATENT DOCUMENTS

CN 108105034 A 6/2018
CN 111637006 A 9/2020
(Continued)

Primary Examiner — David E Sosnowski
Assistant Examiner — Jason G Davis
(74) Attorney, Agent, or Firm — Jeremy Briggs

(57) ABSTRACT

A method for installing a rotor assembly is disclosed. The method may include attaching a mast bottom end to a tower, and unhooking a first blade-arm bundle. The method may further include laterally extending a blade such that the blade may be disposed at a predefined distance from the mast. The method may further include unhooking a first arm-brace bundle, and attaching a first bracing member distal end to the mast between a mast top end and the mast bottom end. The method may further include unhooking a second blade-arm bundle, and attaching a second arm distal end to the mast. The method may further include unhooking the second arm-brace bundle, and attaching a second bracing member distal end to the mast between the mast top end and the mast bottom end.

19 Claims, 11 Drawing Sheets

(51) Int. Cl.
  *F03D 13/20* (2016.01)
  *F03D 13/40* (2016.01)
(52) U.S. Cl.
  CPC ..... *F05B 2230/60* (2013.01); *F05B 2240/211* (2013.01)
(58) Field of Classification Search
  CPC .... F03D 13/40; F03D 13/401; F05B 2230/60; F05B 2240/211
  See application file for complete search history.

(56) References Cited

U.S. PATENT DOCUMENTS

| | | | |
|---|---|---|---|
| 9,222,461 B2 * | 12/2015 | Aranovich | ............... F03D 9/25 |
| 10,344,742 B2 * | 7/2019 | Whitehouse | ............ F03D 13/25 |
| 2010/0172759 A1 * | 7/2010 | Sullivan | ................... F03D 9/25 416/41 |
| 2011/0042958 A1 | 2/2011 | Vander Straeten | |

FOREIGN PATENT DOCUMENTS

| | | |
|---|---|---|
| CN | 215805001 U | 2/2022 |
| CN | 217327545 U | 8/2022 |
| CN | 114992045 A | 9/2022 |

* cited by examiner

METHOD FOR INSTALLING A ROTOR ASSEMBLY

CROSS-REFERENCE TO RELATED APPLICATIONS

The present application claims priority to, the benefit of, and is a divisional of U.S. patent application Ser. No. 18/328,746, filed on Jun. 4, 2023, which is hereby incorporated by reference herein in its entirety.

TECHNICAL FIELD

The present disclosure relates to a rotor assembly of a vertical axis wind turbine, and more specifically to a collapsible rotor assembly of a vertical axis wind turbine and a method for assembling the collapsible rotor assembly.

BACKGROUND

A vertical axis wind turbine includes a plurality of rotor assembly units including, but not limited to, a mast, blades, arms, multiple connection members, and/or the like. A conventional method to install a vertical axis wind turbine includes manufacturing the rotor assembly units in a manufacturing plant/shop, and then transporting the units to the field. Contractors in the field then assemble each unit, one-by-one, to install the wind turbine in the field.

Assembling different rotor assembly units in the field may be challenging and time-consuming for the contractors. For example, it may take more than a day to assemble all the rotor assembly units in the field, which may result in inconvenience for the contractors.

Thus, there is a need for a rotor assembly that may be easy to install in the field.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
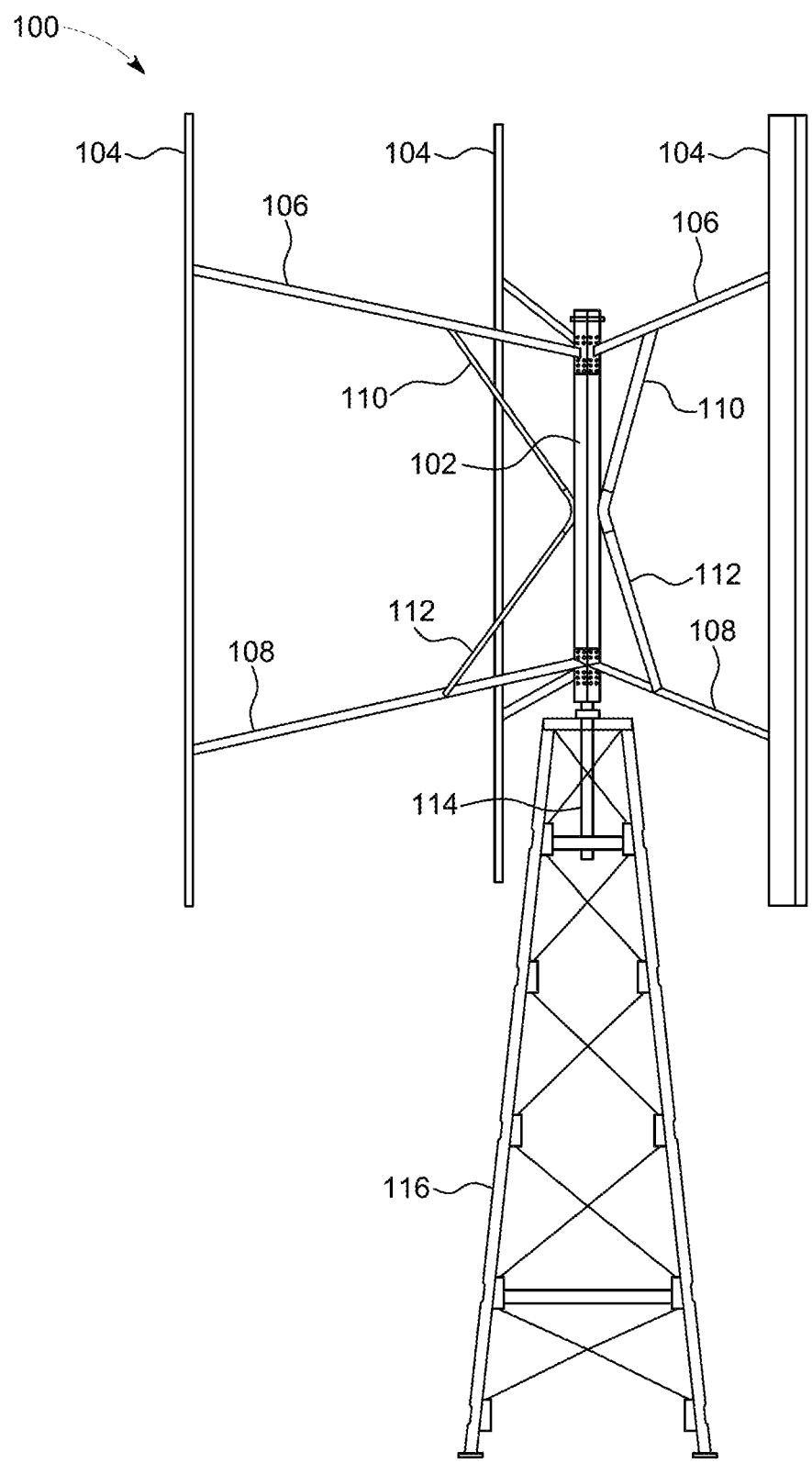
FIG. 1 depicts an example vertical axis wind turbine in accordance with the present disclosure.

The present disclosure is directed to a rotor assembly of a vertical axis wind turbine. Specifically, the present disclosure is directed to a collapsible rotor assembly that may be pre-assembled in a manufacturing plant/shop and transported to field, where a contractor may conveniently install the rotor assembly over a drive shaft or a tower. The rotor assembly may include a plurality of units including, but not limited to, a mast, blades, upper arms, lower arms, upper vertical bracing members, lower vertical bracing members, a plurality of connection members, and/or the like. In an exemplary aspect, the rotor assembly may include three blades, three upper arms and three lower arms. Each blade may be attached to one upper arm and one lower arm. Proximal end of each upper arm may be pivotally attached to a blade top portion and the distal end of the upper arm may be pivotally attached to a mast top portion. Further, proximal end of each lower arm may be pivotally attached to a blade bottom portion and the distal end of the lower arm may be removably attached to a mast bottom portion. Specifically, when the rotor assembly may be in "collapsed state", the lower arm distal end may be detached from (or not attached with) the mast bottom portion. On the other hand, when the rotor assembly may be in "installed state" in the field, the lower arm distal end may be attached with the mast bottom portion.

Proximal end of each upper vertical bracing member may be pivotally attached to the upper arm between an upper arm proximal and an upper arm distal end. The distal end of the upper vertical bracing member may be removably attached to the mast between a mast top end and a mast bottom end. Specifically, in the rotor assembly collapsed state, the distal end of the upper vertical bracing member may be detached from (or not attached with) the mast. On the other hand, in the rotor assembly installed state, the distal end of the upper vertical bracing member may be attached to the mast.

Similarly, proximal end of each lower vertical bracing member may be pivotally attached to the lower arm between a lower arm proximal and a lower arm distal end. The distal end of the lower vertical bracing member may be removably attached to the mast between the mast top end and the mast bottom end. Specifically, in the rotor assembly collapsed state, the distal end of the lower vertical bracing member may be detached from (or not attached with) the mast. On the other hand, in the rotor assembly installed state, the distal end of the lower vertical bracing member may be attached to the mast.

The present disclosure further describes a method to bundle a collapsible rotor assembly, e.g., in the manufacturing plant/shop before the rotor assembly may be transported to the field. In some aspects, to bundle the rotor assembly, a contractor or a robot may hook the lower arm and the lower vertical bracing member together via cords, ropes, etc. or fasteners to form a first arm-brace bundle. The contractor may then hook the first arm-brace bundle with the blade to form a first blade-arm bundle.

Furthermore, the contractor may hook the upper arm with the upper vertical bracing member to form a second arm-brace bundle. The contractor may then hook the second arm-brace bundle with the blade to form a second blade-arm bundle. In some aspects, the contractor may hook the second arm-brace bundle with the blade such that the first blade-arm bundle may be disposed between the second arm-brace bundle and the blade.

When the second blade-arm bundle may be formed, the rotor assembly may be in the collapsed state, and the contractor may transport the rotor assembly to the field.

The present disclosure additionally describes a method to install the collapsible rotor assembly in the field. To install the rotor assembly, the contractor may attach the mast bottom end to the drive shaft/tower top end. The contractor may then unhook the second blade-arm bundle and extend the blade away from the mast. Further, the contractor may unhook the second arm-brace bundle and attach the upper vertical bracing member to the mast. The contractor may then unhook the first blade arm bundle and attach the lower arm to the mast. Furthermore, the contractor may unhook the first arm brace bundle and attach the lower vertical bracing member to the mast. In this manner, the contractor may install the rotor assembly in the field.

The present disclosure discloses a collapsible rotor assembly of a vertical axis wind turbine that is easy to transport from the shop and convenient for the contractor to install in the field. Since the rotor assembly is "pre-assembled" in the shop, considerable time and effort for the contractor may be saved to install the rotor assembly in the field. Further, the contractor may easily install the rotor assembly by using limited equipment as complex rotor component assembly may not be required to be done in the field, thus saving equipment and logistics cost for the contractor.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 2:
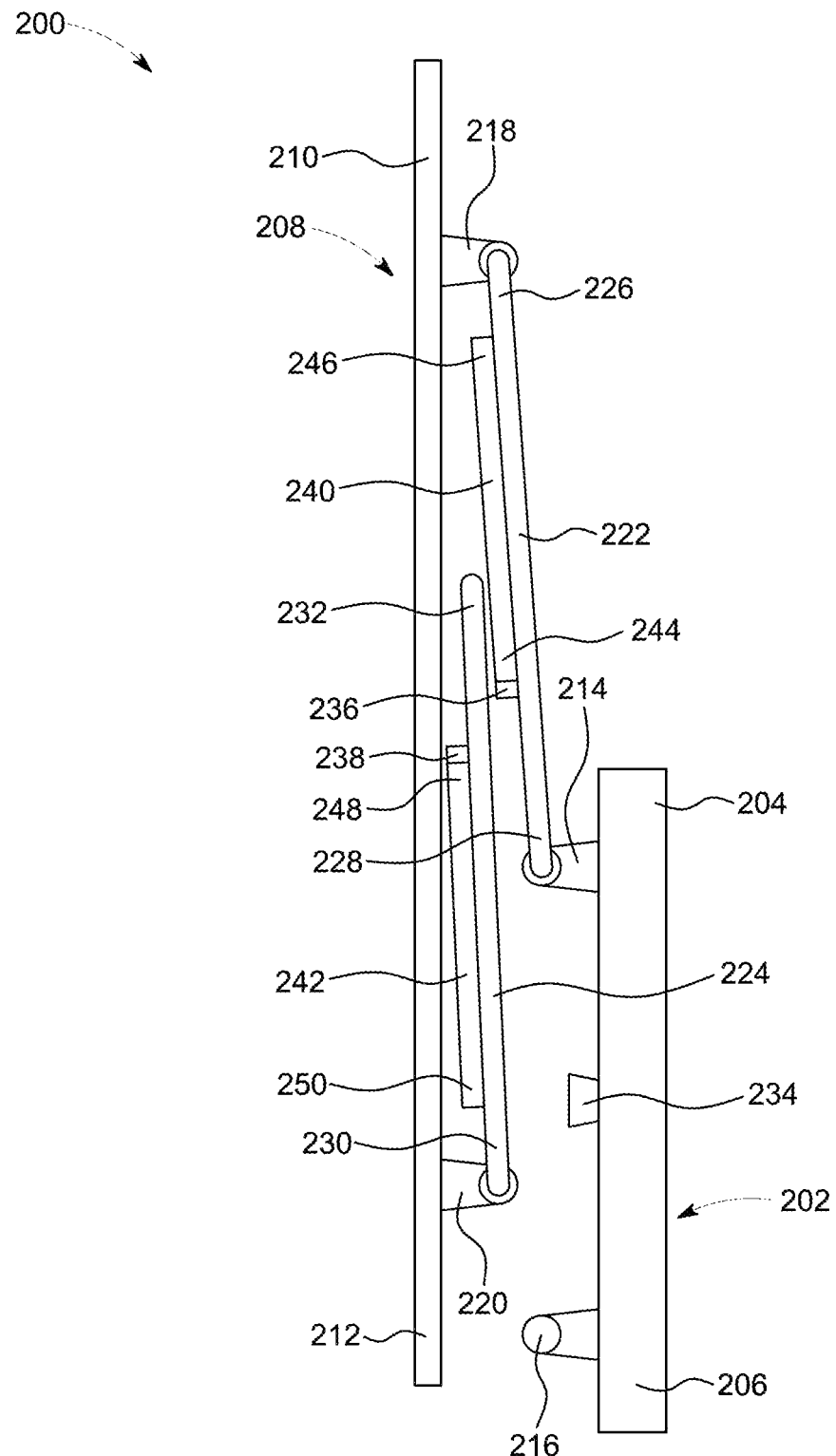
FIG. 2 depicts a side view of an example collapsible rotor assembly of a vertical axis wind turbine in accordance with the present disclosure.

FIG. 1 depicts an example vertical axis wind turbine 100 (wind turbine 100) in accordance with the present disclosure. The wind turbine 100 may include a rotor assembly having one or more units including, but not limited to, a vertical mast 102, one or more blades 104, upper arms 106, lower arms 108, upper vertical bracing members 110 and lower vertical bracing members 112. The rotor assembly may be a "collapsible" rotor assembly that may be packaged or assembled in a collapsed state (as shown in FIG. 2) in a manufacturing plant/shop and transported to field. In the field, the rotor assembly in the collapsed state may be placed over a drive shaft 114 and/or a tower 116 and then easily "extended" to be in a final installed state, as shown in FIG. 1. Structural details of the collapsible rotor assembly are depicted in FIG. 2 and described later in the description below. Further, the process of installing the collapsible rotor assembly in the field is described later below in conjunction with FIGS. 4A and 4B.

The mast 102 may be made of metal such as aluminum, iron, steel, lightweight alloy, and/or the like. In the installed state, the mast bottom end may be connected to the drive shaft 114 (specifically to a drive shaft top end). Further, in the installed state, the mast 102 may be disposed or aligned perpendicular to ground. The mast 102 may be of any length depending on one or more parameters including wind turbine dimensions, location of geographical area where the wind turbine 100 may be located, desired electric power output from the wind turbine 100, and/or the like. Further, the mast 102 may be polygonal in shape having a predefined count of faceted surfaces. For example, in a preferred aspect, the mast 102 may have hexagonal cross-section. In other aspects, the mast 102 may have cuboidal, pentagonal, octagonal, etc., cross-sectional shape. Furthermore, in some aspects, the mast 102 may be hollow throughout a mast length. In other aspects, one or more mast interior portions may be hollow, and remaining mast interior portions may be solid.

The drive shaft bottom end may be connected directly or through a gearbox to a power generator (not shown) that may be configured to generate electric power when the mast 102 rotates (thus rotating the drive shaft 114). Specifically, the power generator may convert mast kinetic energy into electric energy, thus generating electric power from the wind turbine 100.

In an exemplary aspect, the wind turbine 100 may include three blades 104 that may be disposed parallel to a mast longitudinal axis. The blades 104 may be hollow elongated airfoil shaped blades, having lengths that may depend on the wind turbine dimensions. The blades 104 may be lightweight, and made of metal such as aluminum. In other aspects, the blades 104 may be made of any other material, e.g., fiberglass, plastic, etc.

In some aspects, the wind turbine 100 may include three upper arms 106 and three lower arms 108. A pair of upper and lower arms may connect a blade to the mast 102. Stated another way, each blade may be attached to one upper arm and one lower arm, and respective upper and lower arms may be connected to the mast 102. In some aspects, one or more connections between the upper and lower arms 106, 108 and the blades 104, and between the upper and lower arms 106, 108 and the mast 102 may be pivotal and/or removable. Details of the arm-blade connections (via respective arm-blade connection members) and the arm-mast connections (via respective arm-mast connection members) are described later below in conjunction with FIG. 2.

Each of the upper and lower arms 106, 108 may be made of the same or similar material as the mast 102 and/or the blades 104, and may be cuboidal in shape. Specifically, the upper and lower arms 106, 108 may be hollow elongated cuboids having dimensions (e.g., length and width) that may vary based on the wind turbine dimensions. In other aspects, the upper and lower arms 106, 108 may be made of extruded or pultruded material and may be airfoil shaped, which may make the upper and lower arms 106, 108 aerodynamic.

In operation, wind may cause the blades 104 to rotate axially relative to the mast 102 longitudinal axis due to the blade airfoil shape. Blade rotation may cause upper and lower arm movement, and thus cause mast rotation. Mast rotation may enable the power generator to generate electric power, as described above.

To ensure that wind turbine structure is robust and can withstand wind turbulence, the wind turbine 100 may include the upper and lower vertical bracing members 110, 112. One end of the upper vertical bracing member 110 may be connected to the upper arm 106 at a point between an upper arm proximal end and an upper arm distal end. The other end of the upper vertical bracing member 110 may be connected to the mast 102 at a point between a mast top end and a mast bottom end. Similarly, one end of the lower vertical bracing member 112 may be connected to the lower arm 108 at a point between a lower arm proximal end and a lower arm distal end. The other end of the lower vertical bracing member 112 may be connected to the mast 102 at a point between the mast top end and the mast bottom end. Connections of the upper and lower vertical bracing members 110, 112 with the upper and lower arms 106, 108 (via respective bracing member-arm connection members) and connections of the upper and lower vertical bracing members 110, 112 with the mast 102 (via respective bracing member-mast connection members) may be pivotal and/or removable. Structural details of connections between the upper and lower vertical bracing members 110, 112 with the upper and lower arms 106, 108, and between the upper and lower vertical bracing members 110, 112 with the mast 102 are described below in conjunction with FIG. 2.

In some aspects, the upper and lower vertical bracing members 110, 112 may be made of same material as the blade 104 and/or the mast 102. Further, the upper and lower vertical bracing members 110, 112 may be shaped as hollow cuboids, and may have dimensions (e.g., length and width) that may be based on the wind turbine dimensions.

The upper and lower vertical bracing members 110, 112, as depicted in FIG. 1 and described above, may enhance wind turbine structural integrity. Specifically, a person ordinarily skilled in the art may appreciate that the upper and lower arms 106, 108 may experience gravitational force, which may exert stresses on the connections between the upper and lower arms 106, 108 and the blades 104, and between the upper and lower arms 106, 108 and the mast 102. Attachment of the upper and lower vertical bracing members 110, 112, as depicted in FIG. 1, may provide vertical support to the upper and lower arms 106, 108 and may facilitate in reducing stresses at the connections described above due to gravitational force and allow for blade arms with smaller profiles to the wind (and thus less drag).

FIG. 2 depicts a side view of an example collapsible rotor assembly 200 of the vertical axis wind turbine 100 in accordance with the present disclosure. The rotor assembly 200 may be same as the rotor assembly described above in conjunction with FIG. 1. In some aspects, FIG. 2 depicts the rotor assembly 200 in a "collapsed" state. Although FIG. 2 depicts a single blade, the rotor assembly 200 may include three blades as described above.

The rotor assembly 200 may include a mast 202 having a mast top portion 204 and a mast bottom portion 206. The mast 202 may be same as the mast 102. The rotor assembly 200 may further include a blade 208 (or three blades 208) having a blade top portion 210 and a blade bottom portion 212. The blade 208 may be same as the blade 104.

The rotor assembly 200 may further include a first connection member 214 attached to the mast top portion 204 and a second connection member 216 attached to the mast bottom portion 206. The rotor assembly 200 may additionally include a third connection member 218 attached to the blade top portion 210 and a fourth connection member 220 attached to the blade bottom portion 212.

Further, the rotor assembly 200 may include a first arm 222 (or an upper arm 222) and a second arm 224 (or a lower arm 224). The upper and lower arms 222, 224 may be same as the upper and lower arms 106, 108 described above in conjunction with FIG. 1. The upper arm 222 may include an upper arm proximal end 226 and an upper arm distal end 228, and the lower arm 224 may include a lower arm proximal end 230 and a lower arm distal end 232.

The upper arm proximal end 226 may be pivotally connected (e.g., via a pinned/hinged connection) with the third connection member 218 and the upper arm distal end 228 may be pivotally connected (e.g., via a pinned/hinged connection) with the first connection member 214. Stated another way, the third connection member 218 may enable pivotal connection between the upper arm 222 and the blade top portion 210, and the first connection member 214 may enable pivotal connection between the upper arm 222 and the mast top portion 204. In some aspects, the first connection member 214 and the third connection member 218 may enable fixed or "non-removable" mast-arm and blade-arm connections, respectively. Stated another way, the upper arm 222 may be pivotally and "fixedly" connected between the blade top portion 210 and the mast top portion 204.

The lower arm proximal end 230 may be pivotally connected (e.g., via a pinned/hinged connection) with the fourth connection member 220. Stated another way, the fourth connection member 220 may enable pivotal connection between the lower arm 224 and the blade bottom portion 212. In some aspects, the fourth connection member 220 may enable fixed or "non-removable" blade-arm connection. Stated another way, the lower arm 224 may be pivotally and "fixedly" connected to the blade bottom portion 212.

The lower arm distal end 232 may be configured to be removably attached with the second connection member 216. In some aspects, in the collapsed state of the rotor assembly 200, the lower arm distal end 232 may be detached from (or not connected with) the second connection member 216, as shown in FIG. 2. On the other hand, when the rotor assembly 200 may be installed in the field, the lower arm distal end 232 may be attached with the second connection member 216. The second connection member 216 may enable pivotal connection (e.g., via a pin/hinge connector) or non-pivotal connection (e.g., via bolts) between the lower arm distal end 232 and the mast bottom portion 206.

The rotor assembly 200 may further include a brace connection member 234 attached to the mast 202 between the mast top portion 204 and the mast bottom portion 206. In the exemplary aspect depicted in FIG. 2, the brace connection member 234 may be equidistant from the mast top portion 204 and the mast bottom portion 206. In other aspects, the brace connection member 234 may be closer to one of the mast portions, i.e., the mast top portion 204 or the mast bottom portion 206.

The rotor assembly 200 may additionally include a fifth connection member 236 attached to the upper arm 222 and a sixth connection member 238 attached to the lower arm 224. The fifth connection member 236 may be attached to the upper arm 222 anywhere between the upper arm proximal end 226 and the upper arm distal end 228. Similarly, the sixth connection member 238 attached to the lower arm 224 anywhere between the lower arm proximal end 230 and the lower arm distal end 232.

Furthermore, the rotor assembly 200 may include a first bracing member 240 (or an upper vertical bracing member 240) and a second bracing member 242 (or a lower vertical bracing member 242) that may be same as the upper and lower vertical bracing members 110, 112 described above in conjunction with FIG. 1. The upper vertical bracing member 240 may include an upper member proximal end 244 and an upper member distal end 246, and the lower vertical bracing member 242 may include a lower member proximal end 248 and a lower member distal end 250.

The upper member proximal end 244 may be pivotally connected with the upper arm 222 between the upper arm proximal end 226 and the upper arm distal end 228 via the fifth connection member 236. Stated another way, the fifth connection member 236 may enable a pivotal connection (e.g., via a pin/hinge connector) between the upper arm 222 and the upper member proximal end 244. In some aspects, the connection between the upper arm 222 and the upper member proximal end 244 may be fixed or non-removable.

Figure 8:
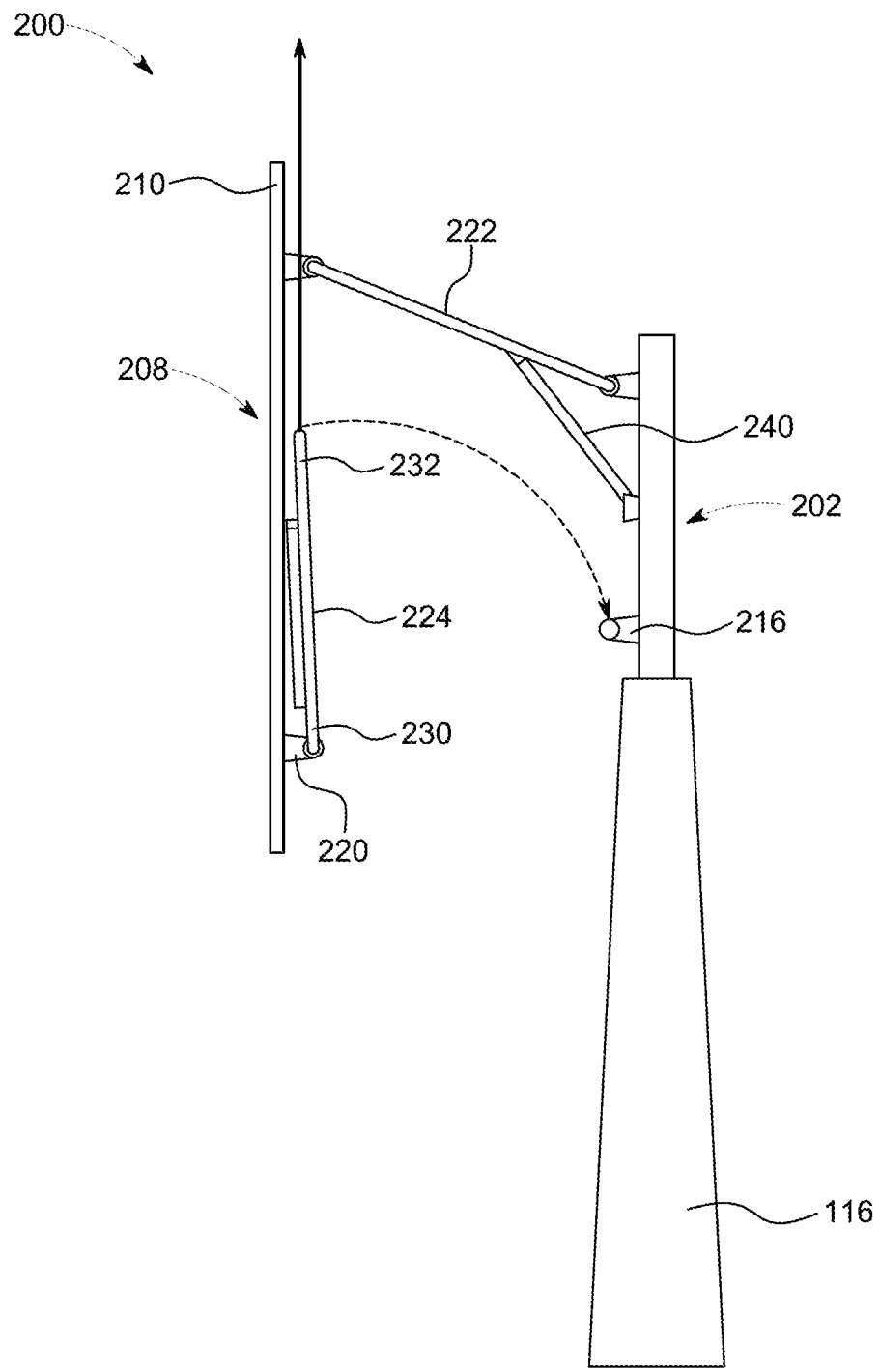
FIG. 8 depicts an example snapshot of a first vertical bracing member connected to the mast in accordance with the present disclosure.
Figure 9:
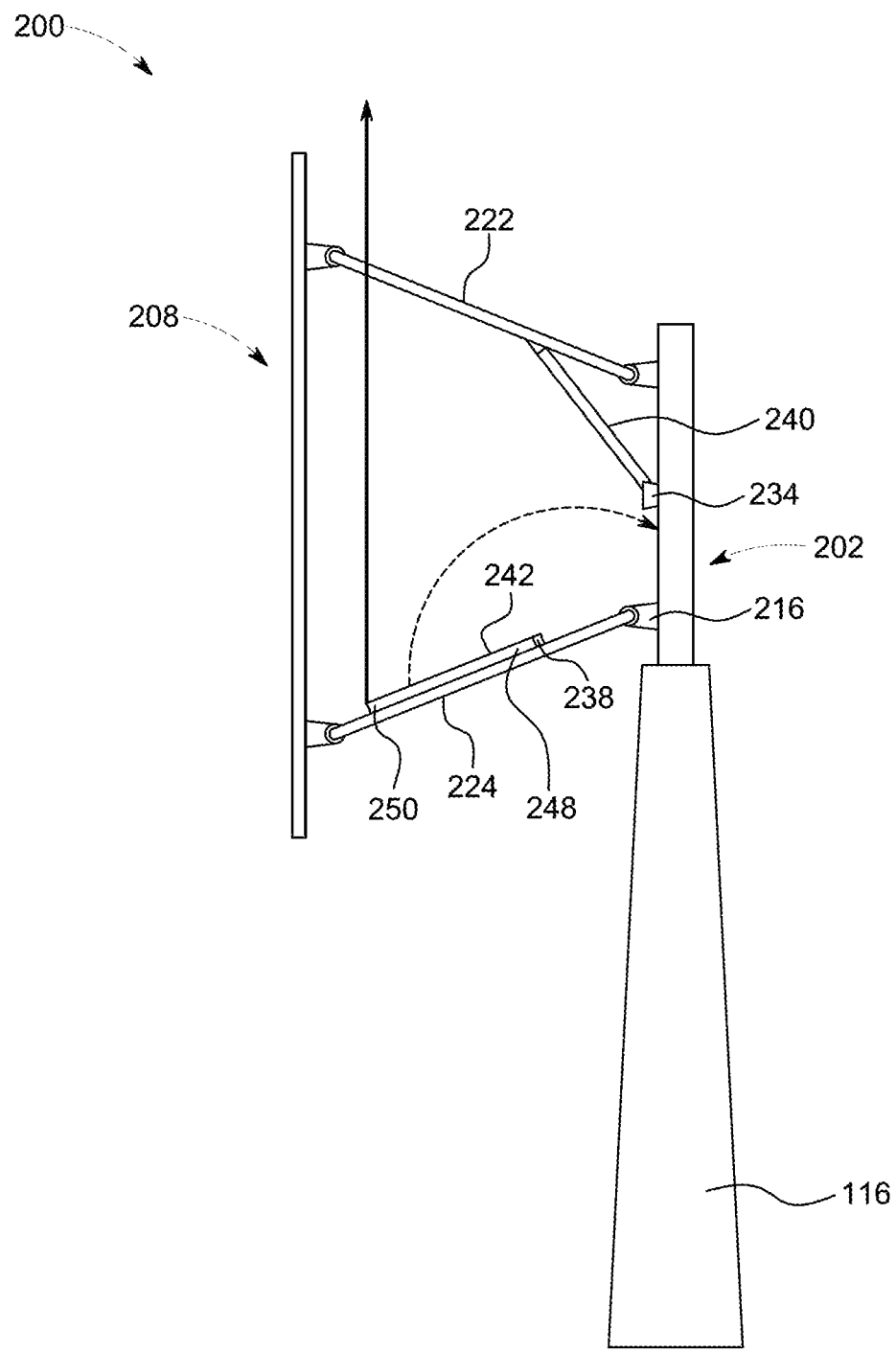
FIG. 9 depicts an example snapshot of a lower arm connected to the mast in accordance with the present disclosure.
Figure 10:
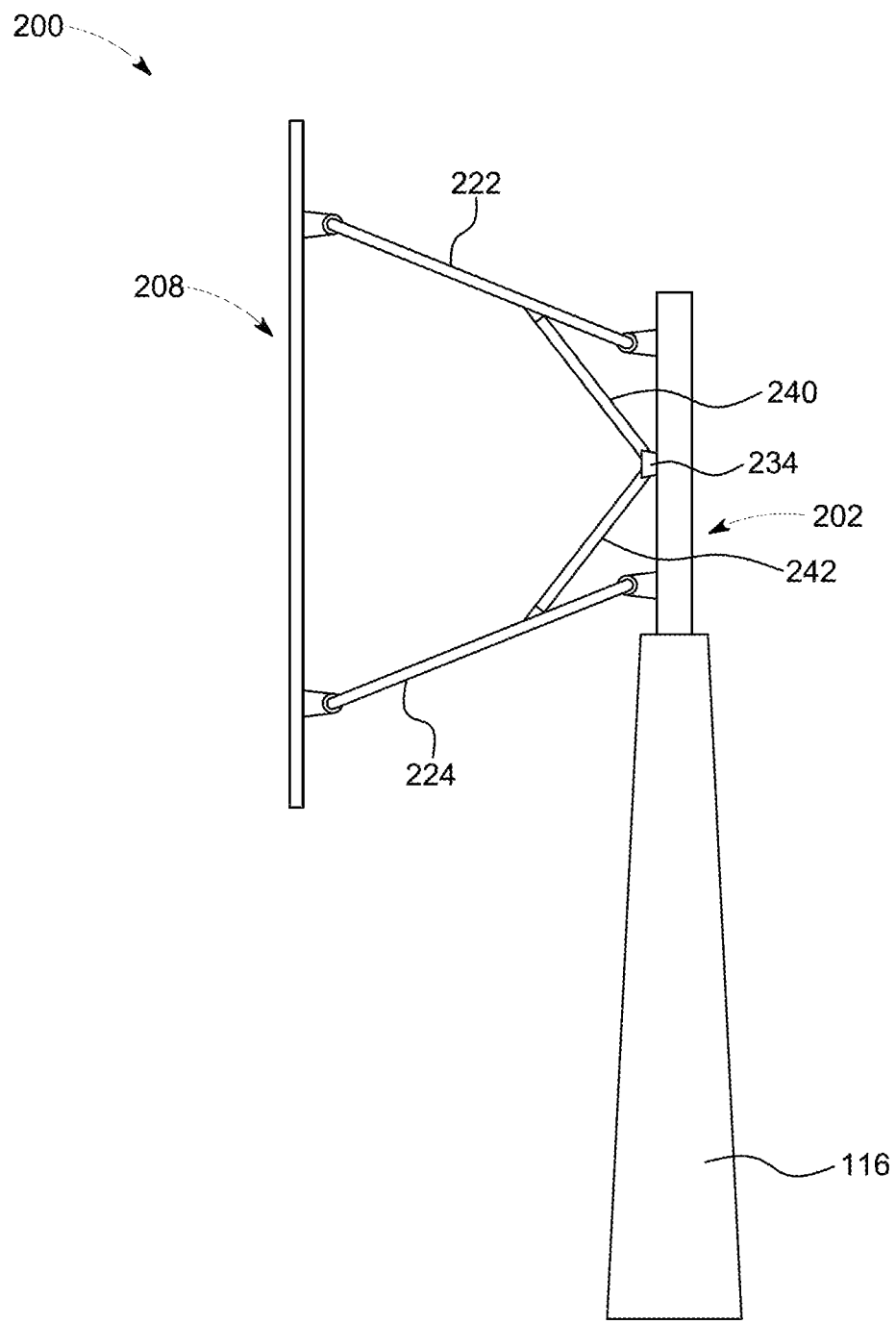
FIG. 10 depicts an example snapshot of the collapsible rotor assembly of FIG. 2 in an installed state in accordance with the present disclosure.

The upper member distal end 246 may be configured to be removably attached with the brace connection member 234 (e.g., via bolts or a pin/hinge connector). Stated another way, the upper member distal end 246 may be configured to be removably attached to the mast 102 via the brace connection member 234. In an exemplary aspect, when the rotor assembly 200 may be in the collapsed state, the upper member distal end 246 may be detached from (or not connected with) the brace connection member 234, as shown in FIG. 2. However, in the installed state of the rotor assembly 200, the upper member distal end 246 may be attached to the brace connection member 234/mast 102, as shown in FIGS. 8-10 and described later in detail below.

In a similar manner, the lower member proximal end 248 may be pivotally connected with the lower arm 224 between the lower arm proximal end 230 and the lower arm distal end 232 via the sixth connection member 238. Stated another way, the sixth connection member 238 may enable a pivotal connection (e.g., via a pin/hinge connector) between the lower arm 224 and the lower member proximal end 248. In some aspects, the connection between the lower arm 224 and the lower member proximal end 248 may be fixed or non-removable.

The lower member distal end 250 may be configured to be removably attached with the brace connection member 234 (e.g., via bolts or a pin/hinge connector). Stated another way, the lower member distal end 250 may be configured to be removably attached to the mast 102 via the brace connection member 234. In an exemplary aspect, when the rotor assembly 200 may be in the collapsed state, the lower member distal end 250 may be detached from (or not connected with) the brace connection member 234, as shown in FIG. 2. However, in the installed state of the rotor assembly 200, the lower member distal end 250 may be attached to the brace connection member 234/mast 102, as shown in FIG. 10 and described later in detail below.

In some aspects, a wind turbine manufacturer or contactor may "hook" or "bundle" different rotor assembly components/units described above to assemble the rotor assembly 200 in the collapsed state, as shown in FIG. 2. The contractor may then transport the rotor assembly 200 in the collapsed state to the field, where the contractor may place the collapsed rotor assembly 200 on the drive shaft 114/tower 116, and then start to "unhook" each component one-by-one to conveniently install the rotor assembly 200 in the field. A person ordinarily skilled in the art may appreciate that since the rotor assembly 200 in the collapsed state is "pre-assembled", the contractor may not be required to assemble the rotor assembly 200 in the field, thereby saving considerable time and effort for the contractor.

The process of bundling the rotor assembly components to assemble the rotor assembly 200 in the collapsed state is described below in conjunction with FIG. 3, and the process of installing the rotor assembly 200 in the field is described later below in conjunction with FIGS. 4A, 4B and 5-10.

Figure 3:
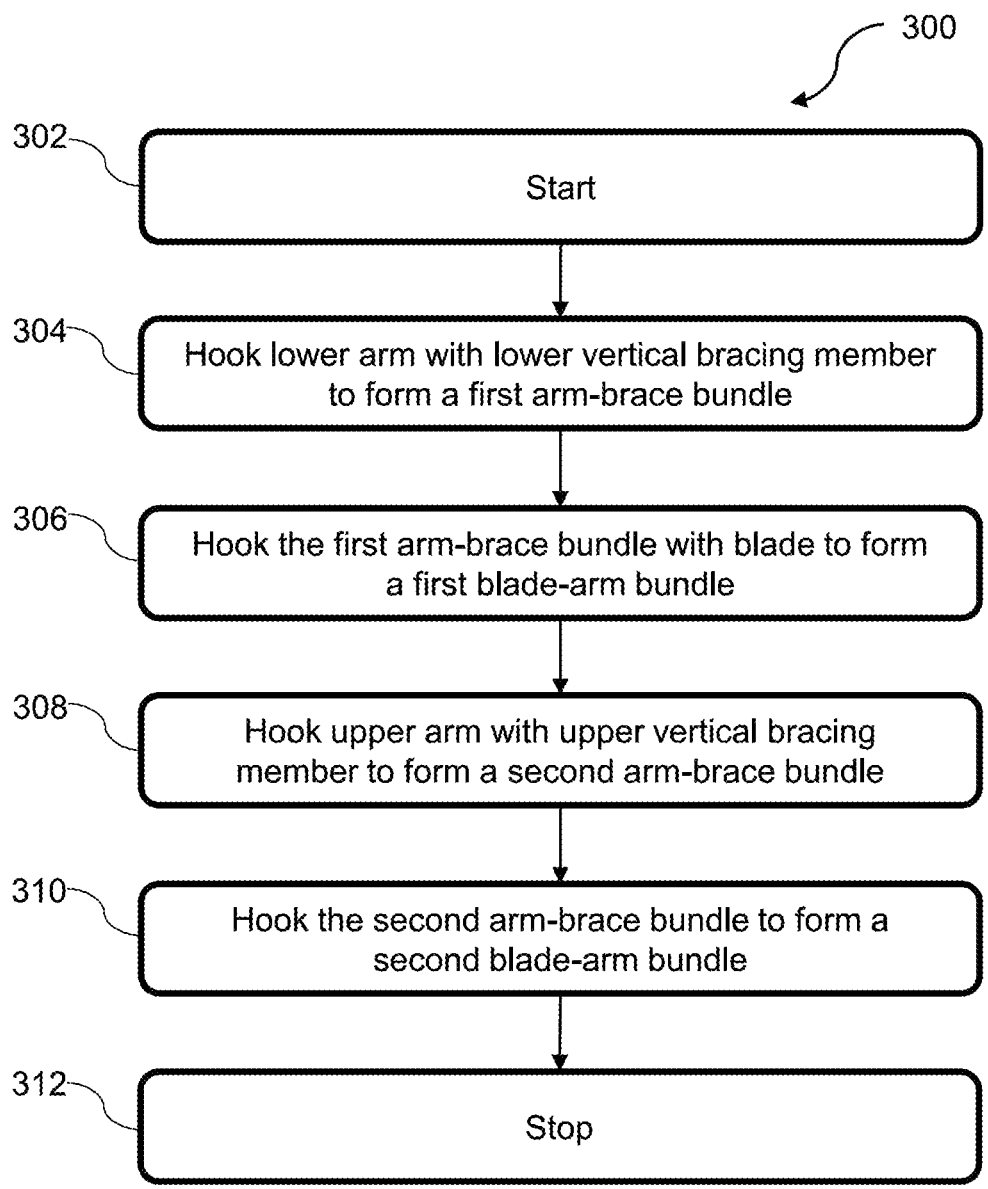
FIG. 3 depicts a flow diagram of a method for bundling a collapsible rotor assembly in accordance with the present disclosure.

FIG. 3 depicts a flow diagram of a method 300 for bundling the collapsible rotor assembly 200 in accordance with the present disclosure. FIG. 3 may be described with continued reference to prior figures, including FIGS. 1 and 2. The following process is exemplary and not confined to the steps described hereafter. Moreover, alternative embodiments may include more or less steps that are shown or described herein and may include these steps in a different order than the order described in the following example embodiments.

In some aspects, before bundling the collapsible rotor assembly 200 as described below, the contractor may attach the plurality of rotor assembly components that are described above in the manufacturing plant/shop. For example, the contractor (or a robot) may attach the first and second connection members 214, 216 to the mast top and bottom portions 204, 206 respectively. The contractor may further attach the third and fourth connection members 218, 220 to the blade top and bottom portions 210, 212 respectively. The contractor may additionally attach the fifth and sixth connection members 236, 238 to the upper and lower arms 222, 224 respectively, as described above. The contractor may also attach the brace connection member 234 to the mast 102 (e.g., at a mast center portion).

The contractor may then pivotally attach the upper member proximal end 244 to the fifth connection member 236 and pivotally attach the lower member proximal end 248 to the sixth connection member 238. The contractor may further pivotally attach the lower arm proximal end 230 to the fourth connection member 220, and attach the upper arm proximal end 226 to the third connection member 218.

In some aspects, the contractor may further pivotally attach the upper arm distal end 228 to the first connection member 214 in the manufacturing plant/shop. In other aspects, the contractor may not attach the upper arm distal end 228 to the first connection member 214 in the manufacturing plant/shop, but may instead attach the upper arm distal end 228 to the first connection member 214 in the field.

The contractor may make the attachments described above for all the three blade assemblies. When the connections/attachments, as described above, are made, the contractor (or the robot) may perform the steps depicted in FIG. 3 and described below to "bundle" the rotor assembly 200 and make it ready for transportation to the field.

The method 300 starts at step 302. At step 304, the method 300 may include hooking the lower arm 224 with the lower vertical bracing member 242 to form a first arm-brace bundle (or a lower arm-lower vertical bracing member bundle). In some aspects, the contractor (or the robot) may hook the lower arm 224 with the lower vertical bracing member 242 by tying the lower arm 224 and the lower vertical bracing member 242 together with cords, ropes, etc., or via removable mechanical fasteners (not shown). In some aspects, the lower arm 224 and the lower vertical bracing member 242 may be disposed parallel to each other in the first arm-brace bundle, as shown in FIG. 2.

At step 306, the method 300 may include hooking the first arm-brace bundle with the blade 208 to form a first blade-arm bundle (or blade-lower arm bundle). In some aspects, the contractor (or the robot) may hook the first arm-brace bundle with the blade 208 by using cords, ropes, etc., or removable mechanical fasteners (not shown).

At step 308, the method 300 may include hooking the upper arm 222 with the upper vertical bracing member 240 to form a second arm-brace bundle (or an upper arm-upper vertical bracing member bundle). In some aspects, the contractor (or the robot) may hook the upper arm 222 with the upper vertical bracing member 240 by using cords, ropes, etc., or removable mechanical fasteners (not shown).

Further, in the second arm-brace bundle, the upper arm 222 and the upper vertical bracing member 240 may be disposed parallel to each other.

At step 310, the method 300 may include hooking the second arm-brace bundle with the blade 208 to form a second blade-arm bundle. As shown in FIG. 2, the second arm-brace bundle may be hooked with the blade 208 such that the first arm-blade bundle may be disposed between the second arm-brace bundle and the blade 208.

When the second blade-arm bundle may be formed, the rotor assembly 200 may take the shape/arrangement as shown in FIG. 2. Stated another way, the rotor assembly 200 may be disposed in the collapsed state when the steps described above may be performed.

Responsive to performing the steps described above, the contractor (or the robot) may laterally or horizontally place the rotor assembly 200 in a truck, such that the mast longitudinal axis may be parallel to truck cargo bed. The contractor may then transport the rotor assembly 200 to the field. When the rotor assembly 200 reaches the field, the rotor assembly 200 may be installed on the drive shaft 114/tower 116, as described below in conjunction with FIGS. 4A, 4B, 5-10.

At step 312, the method 300 ends.

Figure 4A:
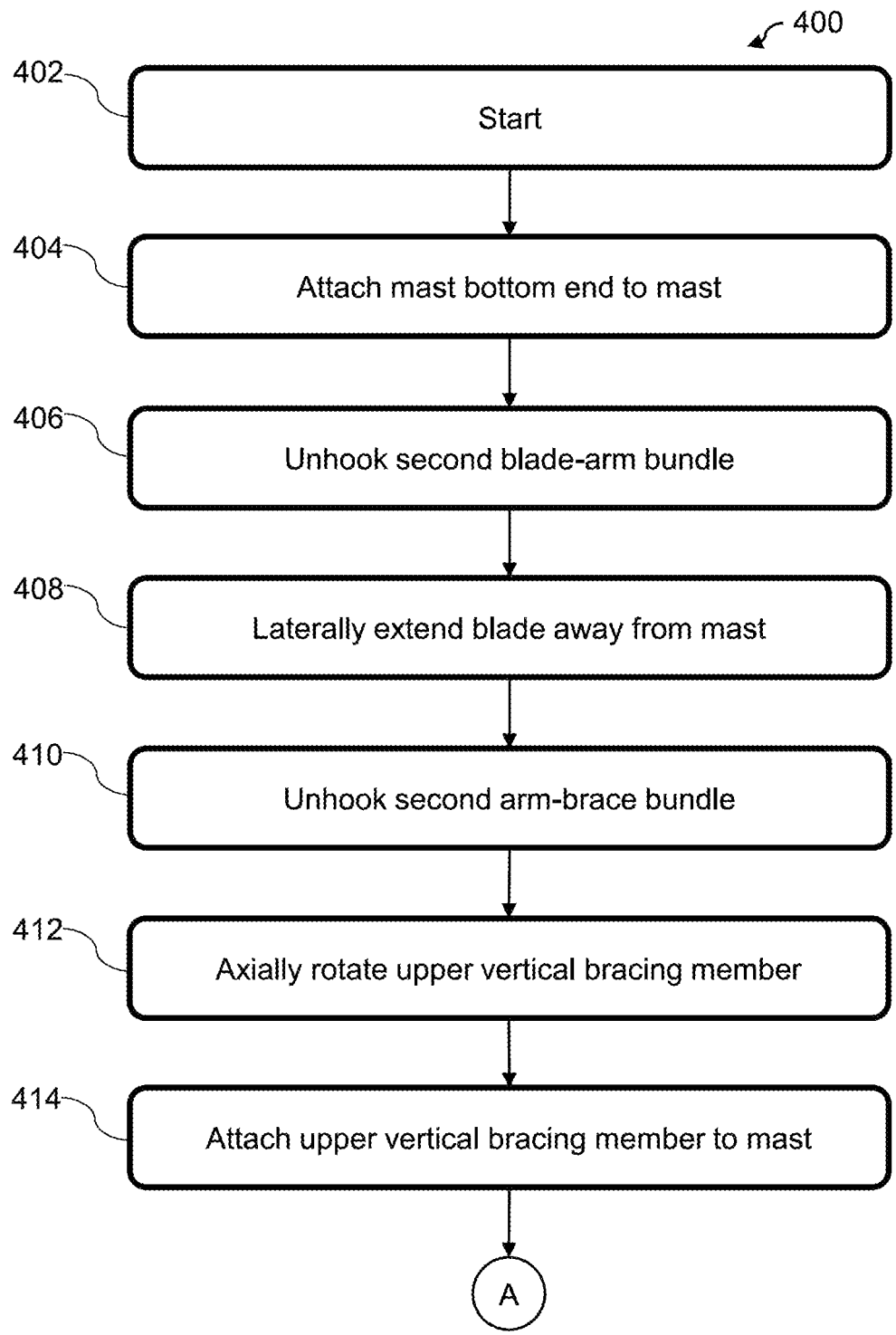
FIGS. 4A and 4B depict a flow diagram of a method for installing the collapsible rotor assembly of FIG. 2 in a field in accordance with the present disclosure.
Figure 4B:
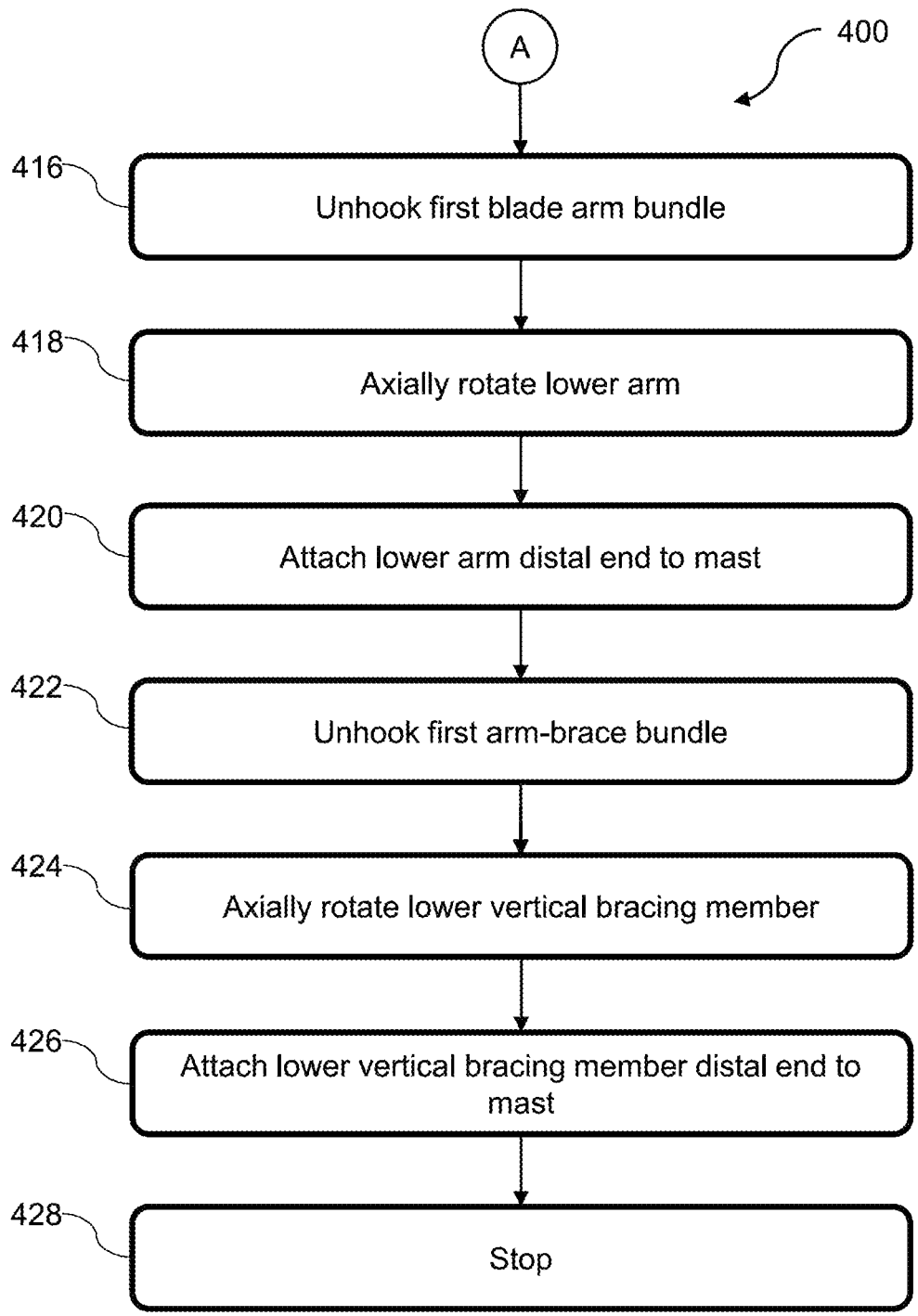

FIGS. 4A and 4B depict a flow diagram of a method 400 for installing the collapsible rotor assembly 200 in the field in accordance with the present disclosure. FIGS. 4A and 4B may be described with continued reference to prior figures, including FIGS. 1-3. Further, FIGS. 4A and 4B may be described with continued reference to subsequent figures, including FIGS. 5-10. The following process is exemplary and not confined to the steps described hereafter. Moreover, alternative embodiments may include more or less steps that are shown or described herein and may include these steps in a different order than the order described in the following example embodiments.

Figure 5:
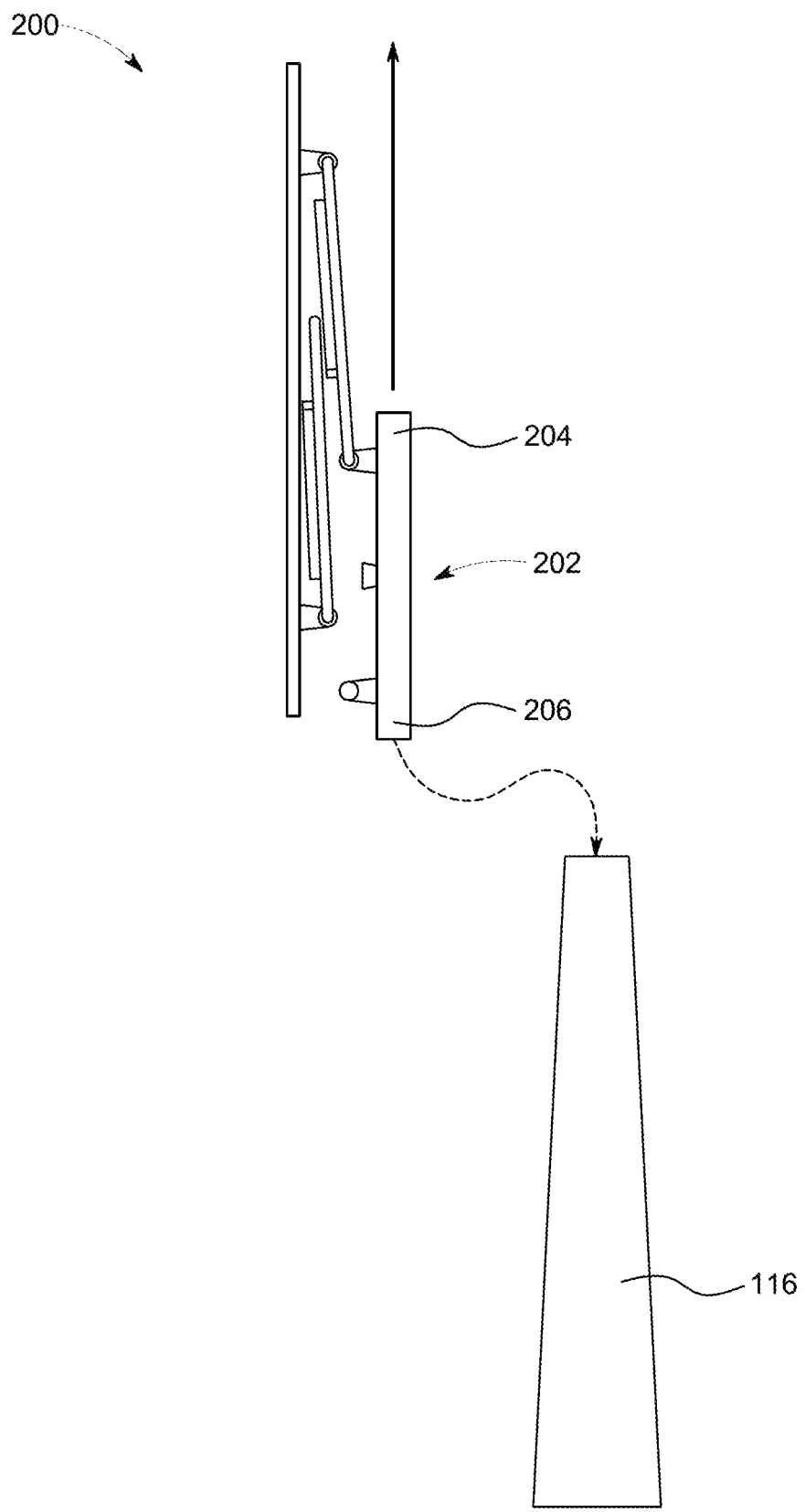
FIG. 5 depicts an example snapshot of the collapsible rotor assembly of FIG. 2 being placed on a drive shaft in accordance with the present disclosure.
Figure 6:
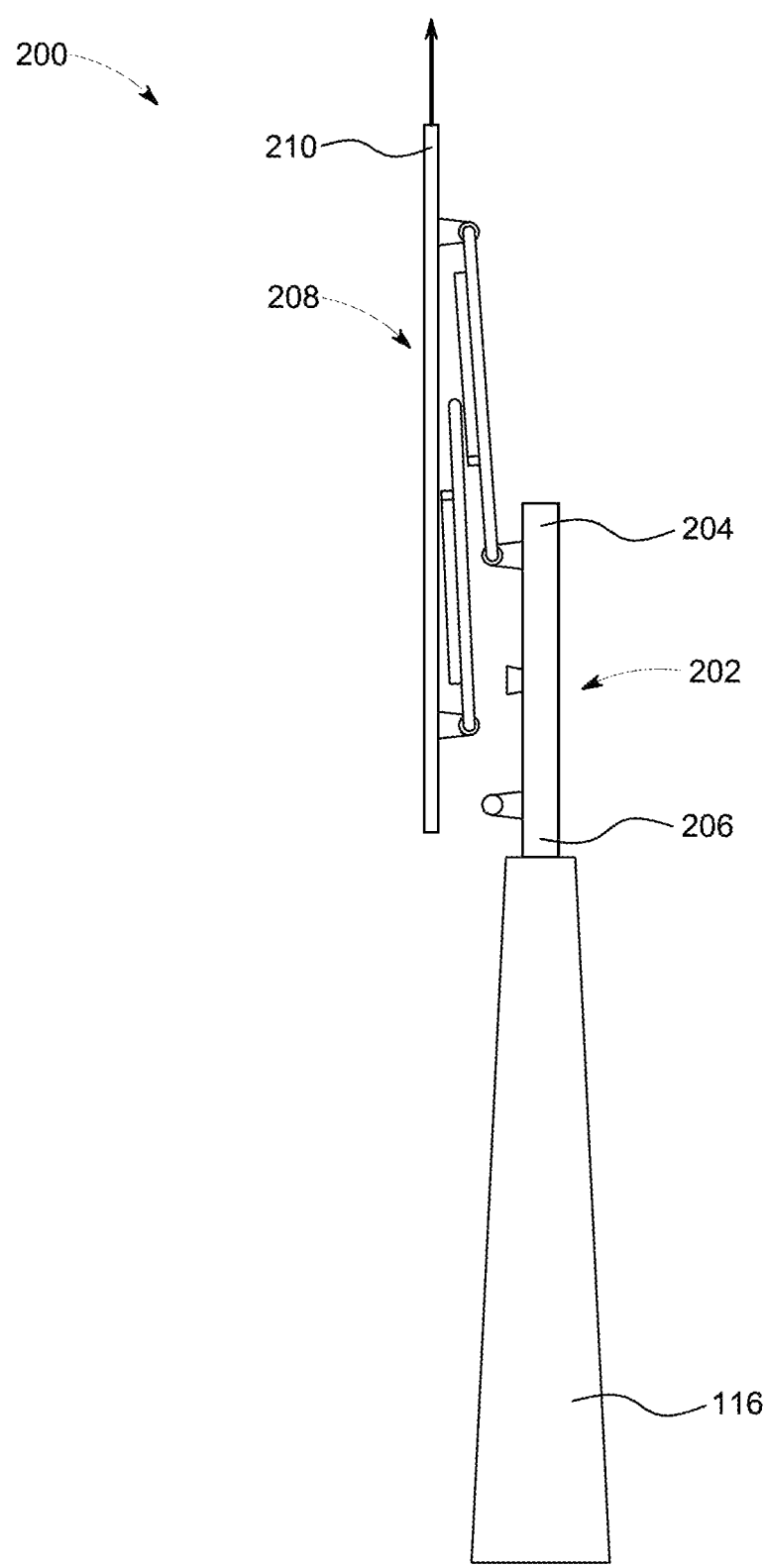
FIG. 6 depicts an example snapshot of the collapsible rotor assembly of FIG. 2 placed on the drive shaft in accordance with the present disclosure.

The method 400 starts at step 402. At step 404, the method 400 may include attaching the mast bottom end to the drive shaft 114 or the tower 116, as shown in FIG. 5. Specifically, at step 404, the contractor may attach a lifting means (e.g., a crane or crane hook) to a mast top end or a point in proximity to the mast top portion 204 and lift the rotor assembly 200 from the truck. Responsive to lifting the rotor assembly 200 from the truck, the contractor may dispose, via the lifting means, the rotor assembly 200 on top of the drive shaft 114 or the tower 116, such that a tower longitudinal axis may be parallel to the mast longitudinal axis. The contractor may then dispose the mast bottom end in proximity to the drive shaft 114 or the tower top end, and attach the mast bottom end to the drive shaft 114 or the tower 116 via fastening means (e.g., bolts, not shown). When the mast bottom end may be attached to the drive shaft 114, the rotor assembly 200 may be attached to the drive shaft 114/tower 116, as shown in FIG. 6.

At step 406, the method 400 may include unhooking the second blade-arm bundle. As described above in conjunction with FIG. 3, the second blade-arm bundle may include the second arm-brace bundle and the blade 208. Further, as described above, the second arm-brace bundle may include the upper arm 222 and the upper vertical bracing member 240. In some aspects, the contractor (or the robot) may unhook the second blade-arm bundle by unhooking respective cords, ropes or the removable mechanical fasteners, as described above in conjunction with FIG. 3.

At step 408, the method 400 may include laterally extending the blade 208 away from the mast 202 such that the blade 208 may be disposed at a predefined distance from the mast 202. The predefined distance may depend on the wind turbine dimensions. In some aspects, at the step 408, the contractor may remove the lifting means from the mast top end and attach the lifting means to the blade top end. The contractor may then extend, via the lifting means, the blade 208 away from the mast 202. An example view of the blade 208 extended away from the mast 202 is depicted in FIG. 7.

At step 410, the method 400 may include unhooking the second arm-brace bundle. As described above in conjunction with FIG. 3, the second arm-brace bundle may include the upper arm 222 with the upper vertical bracing member 240. The contractor may unhook the second arm-brace bundle by unhooking respective cords, ropes, etc. or the mechanical fasteners.

Figure 7:
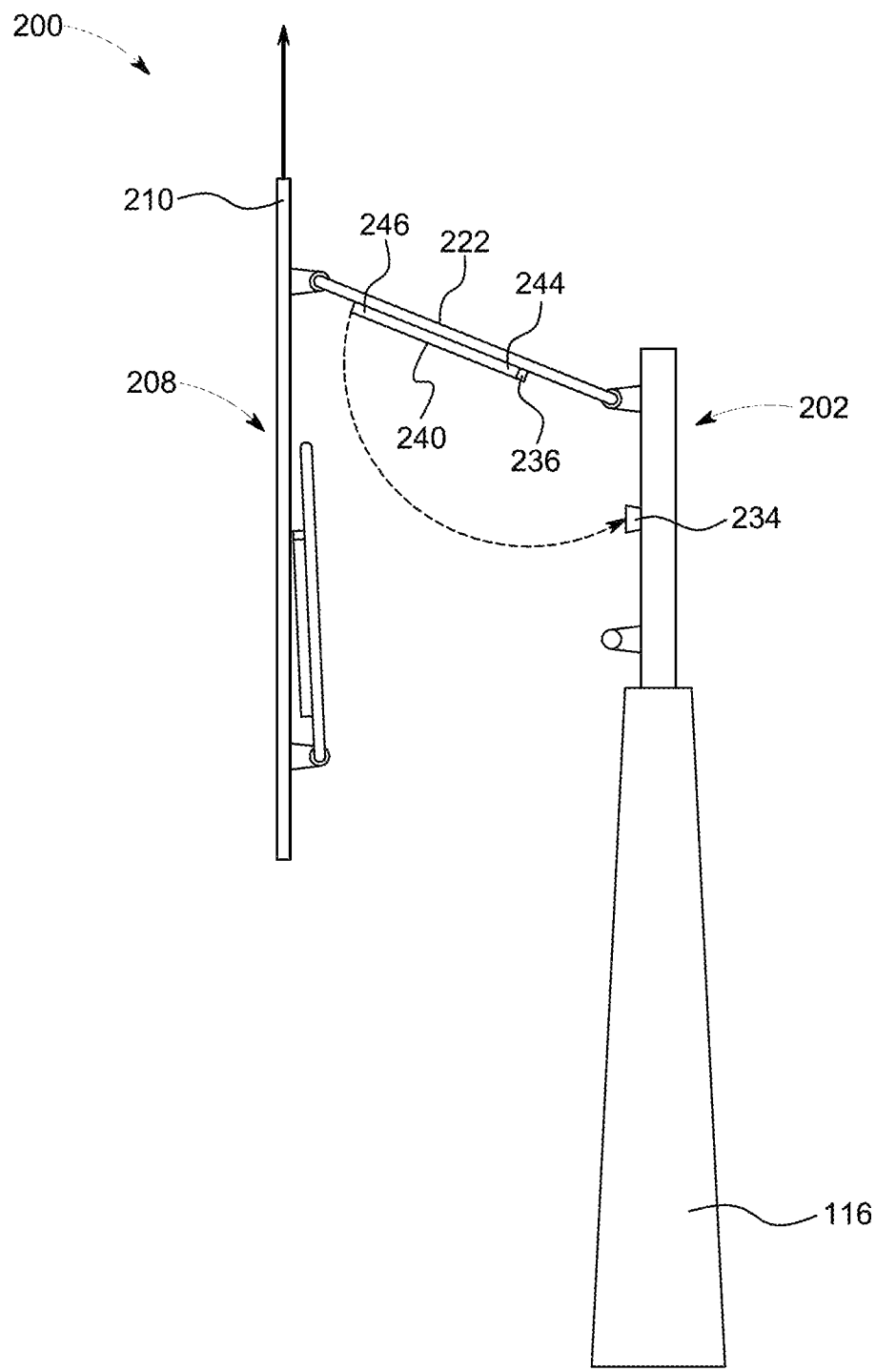
FIG. 7 depicts an example snapshot of a blade extended away from a mast in accordance with the present disclosure.

At step 412, the method 400 may include axially rotating the upper vertical bracing member 240 about the upper member proximal end 244 (or about the fifth connection member 236), as shown in FIG. 7. At step 414, the method 400 may include attaching (e.g., via bolts, pinned/hinged connectors, etc.) the upper vertical bracing member 240, or specifically the upper member distal end 246, to the mast 202 between the mast top portion 204 (or mast top end) and the mast bottom portion 206 (or mast bottom end). Specifically, at the step 414, the upper member distal end 246 may be attached to the brace connection member 234.

An example view of the upper vertical bracing member 240 connected with the mast 202 is depicted in FIG. 8. Responsive to attaching the upper vertical bracing member 240 with the mast 202, the contractor may remove the lifting means from the blade top end and attach the lifting means to the lower arm distal end 232. Responsive to attaching the lifting means to the lower arm distal end 232, the method 400 moves to step 416. At the step 416, the method 400 may include unhooking the first blade-arm bundle. As described above in conjunction with FIG. 3, the first blade-arm bundle may include the first arm-brace bundle and the blade 208. Further, the first arm-brace bundle may include the lower arm 224 and the lower vertical bracing member 242. In some aspects, the contractor (or the robot) may unhook the first blade-arm bundle by unhooking respective cords, ropes or the removable mechanical fasteners, as described above in conjunction with FIG. 3.

At step 418, the method 400 may include axially rotating the lower arm 224 about the lower arm proximal end 230 by using the lifting means. Specifically, at the step 418, the contractor may use the lifting means to axially rotate the lower arm 224 about the fourth connection member 220, as shown in FIG. 8.

At step 420, the method 400 may include attaching (e.g., via bolts, pin/hinge connector, etc.) the lower arm distal end 232 to the mast 202 via the second connection member 216. Specifically, at step 420, the lower arm distal end 232 may be attached to the second connection member 216. An example view of the lower arm distal end 232 or the lower arm 224 connected to the second connection member 216 is depicted in FIG. 9.

When the lower arm distal end 232 may be attached to the second connection member 216, the lifting means may be removed from the lower arm distal end 232 and attached to the lower member distal end 250.

At step 422, the method 400 may include unhooking the first arm-brace bundle. At step 424, the method 400 may include lifting the lower member distal end 250 by using the lifting means and axially rotating the lower vertical bracing member 242 about the lower member proximal end 248. Specifically, at step 424, the contractor may axially rotate the lower vertical bracing member 242 about the sixth connection member 238, as shown in FIG. 9.

At step 426, the method 400 may include attaching the lower member distal end 250 to the mast 202 between the mast top and bottom portions 204, 206. Specifically, at step 426, the contractor may attach the lower member distal end 250 to the brace connection member 234, and remove the lifting means from the lower member distal end 250. When the lower member distal end 250 may be attached to the brace connection member 234, the rotor assembly 200 may be in the "installed state", as shown in FIG. 10.

The contractor may repeat the same process as described above for the remaining two blades to install the vertical axis wind turbine 100 in the field.

At step 428, the method 400 ends.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for installing a rotor assembly comprising:
   attaching a mast bottom end of a mast to a drive shaft or a tower;
   unhooking a first blade-arm bundle, wherein the first blade-arm bundle comprises a first arm-brace bundle and a blade, wherein:
      the first arm-brace bundle comprises a first arm and a first bracing member,
      a first bracing member proximal end is pivotally connected to the first arm between a first arm proximal end and a first arm distal end,
      the first arm distal end is pivotally connected to the mast, and
      the first arm proximal end is pivotally connected to a blade top portion;
   laterally extending the blade such that the blade is disposed at a predefined distance from the mast;
   unhooking the first arm-brace bundle;
   attaching a first bracing member distal end to the mast between a mast top end and the mast bottom end;
   unhooking a second blade-arm bundle, wherein:
      the second blade-arm bundle comprises a second arm-brace bundle and the blade,
      the second arm-brace bundle comprises a second arm and a second bracing member, and
      a second arm proximal end is pivotally connected to a blade bottom portion;
   attaching a second arm distal end to the mast;
   unhooking the second arm-brace bundle, wherein a second bracing member proximal end is pivotally connected to the second arm between a second arm proximal end and the second arm distal end; and
   attaching a second bracing member distal end to the mast between the mast top end and the mast bottom end.

2. The method of claim 1 further comprising:
   axially rotating the first bracing member about the first bracing member proximal end to attach the first bracing member distal end to the mast;
   axially rotating the second arm about the second arm proximal end to attach the second arm distal end to the mast; and
   axially rotating the second bracing member about the second bracing member proximal end to attach the second bracing member distal end to the mast.

3. The method of claim 1, wherein the mast is a polygonal mast.

4. The method of claim 1, wherein the rotor assembly is part of a vertical axis wind turbine.

5. The method of claim 1 further comprising:
   attaching a lifting means to the mast top end;
   causing the lifting means to lift the rotor assembly;

disposing the rotor assembly on top of the drive shaft or the tower; and
attaching the mast bottom end to the drive shaft or the tower responsive to disposing the rotor assembly on top of the drive shaft or the tower.

6. The method of claim 5, wherein disposing the rotor assembly on top of the drive shaft or the tower comprises disposing the rotor assembly such that a tower longitudinal axis is parallel to a mast longitudinal axis.

7. The method of claim 5, wherein the lifting means is a crane.

8. The method of claim 1, wherein each of the unhooking the first blade-arm bundle, unhooking the first arm-brace bundle, unhooking the second blade-arm bundle, and unhooking the second arm-brace bundle comprises unhooking one or more removable mechanical fasteners.

9. The method of claim 1, wherein the mast comprises a brace connection member disposed between the mast top end and the mast bottom end, and wherein attaching the first bracing member to the mast comprises attaching the first bracing member to the brace connection member.

10. The method of claim 9, wherein attaching the second bracing member distal end to the mast comprises attaching the second bracing member distal end to the brace connection member.

11. The method of claim 1, wherein the mast comprises a connection member disposed at a mast bottom portion, and wherein attaching the second arm distal end to the mast comprises attaching the second arm distal end to the connection member.

12. A method for installing a rotor assembly comprising:
attaching a mast bottom end of a mast to a drive shaft or a tower;
unhooking a first blade-arm bundle, wherein the first blade-arm bundle comprises a first arm-brace bundle and a blade, wherein:
the first arm-brace bundle comprises a first arm and a first bracing member,
a first bracing member proximal end is pivotally connected to the first arm between a first arm proximal end and a first arm distal end,
the first arm distal end is pivotally connected to the mast, and
the first arm proximal end is pivotally connected to a blade top portion;
attaching a lifting means to a blade top end;
causing the lifting means to laterally extend the blade such that the blade is disposed at a predefined distance from the mast;
unhooking the first arm-brace bundle;
attaching a first bracing member distal end to the mast between a mast top end and the mast bottom end;
unhooking a second blade-arm bundle, wherein:
the second blade-arm bundle comprises a second arm-brace bundle and the blade,
the second arm-brace bundle comprises a second arm and a second bracing member, and
a second arm proximal end is pivotally connected to a blade bottom portion;
attaching a second arm distal end to the mast;
unhooking the second arm-brace bundle, wherein a second bracing member proximal end is pivotally connected to the second arm between a second arm proximal end and the second arm distal end; and
attaching a second bracing member distal end to the mast between the mast top end and the mast bottom end.

13. The method of claim 12, wherein the lifting means is a crane.

14. The method of claim 12 further comprising:
axially rotating the first bracing member about the first bracing member proximal end to attach the first bracing member distal end to the mast;
axially rotating the second arm about the second arm proximal end to attach the second arm distal end to the mast; and
axially rotating the second bracing member about the second bracing member proximal end to attach the second bracing member distal end to the mast.

15. The method of claim 12, wherein the mast is a polygonal mast.

16. The method of claim 12, wherein the rotor assembly is part of a vertical axis wind turbine.

17. The method of claim 12 further comprising:
attaching the lifting means to the mast top end;
causing the lifting means to lift the rotor assembly;
disposing the rotor assembly on top of the drive shaft or the tower; and
attaching the mast bottom end to the drive shaft or the tower responsive to disposing the rotor assembly on top of the drive shaft or the tower.

18. The method of claim 17, wherein disposing the rotor assembly on top of the drive shaft or the tower comprises disposing the rotor assembly such that a tower longitudinal axis is parallel to a mast longitudinal axis.

19. A method for installing a rotor assembly comprising:
attaching a mast bottom end of a mast to a drive shaft or a tower, wherein the mast is a polygonal mast;
unhooking a first blade-arm bundle, wherein the first blade-arm bundle comprises a first arm-brace bundle and a blade, wherein:
the first arm-brace bundle comprises a first arm and a first bracing member,
a first bracing member proximal end is pivotally connected to the first arm between a first arm proximal end and a first arm distal end,
the first arm distal end is pivotally connected to the mast, and
the first arm proximal end is pivotally connected to a blade top portion;
laterally extending the blade such that the blade is disposed at a predefined distance from the mast;
unhooking the first arm-brace bundle;
attaching a first bracing member distal end to the mast between a mast top end and the mast bottom end;
unhooking a second blade-arm bundle, wherein:
the second blade-arm bundle comprises a second arm-brace bundle and the blade,
the second arm-brace bundle comprises a second arm and a second bracing member, and
a second arm proximal end is pivotally connected to a blade bottom portion;
attaching a second arm distal end to the mast;
unhooking the second arm-brace bundle, wherein a second bracing member proximal end is pivotally connected to the second arm between a second arm proximal end and the second arm distal end; and
attaching a second bracing member distal end to the mast between the mast top end and the mast bottom end,
wherein the rotor assembly is part of a vertical axis wind turbine.

* * * * *